US005738287A

United States Patent [19]

Vanderberg

[11] Patent Number: 5,738,287

[45] Date of Patent: Apr. 14, 1998

[54] BALE SEPARATOR

[75] Inventor: Ed Vanderberg, Coalhurst, Canada

[73] Assignee: Fastec Manufacturing Ltd., Fort MacLeod

[21] Appl. No.: 897,010

[22] Filed: Jul. 18, 1997

Related U.S. Application Data

[63] Continuation of Ser. No. 588,819, Jan. 19, 1996, abandoned.

[51] Int. Cl.$^6$ .............................. B02C 18/06; B02C 21/02

[52] U.S. Cl. ...................... 241/101.76; 241/282; 241/605

[58] Field of Search .............................. 241/101.76, 194, 241/280, 281, 282, 605

[56] References Cited

U.S. PATENT DOCUMENTS

| | | | |
|---|---|---|---|
| 4,068,804 | 1/1978 | Butler et al. | 241/101 |
| 4,227,654 | 10/1980 | Seefeld et al. | 241/34 |
| 4,524,916 | 6/1985 | Keyes et al. | 241/186.4 X |
| 4,573,846 | 3/1986 | Willbanks et al. | 414/24.6 |
| 4,597,703 | 7/1986 | Bartolini | 241/605 X |
| 4,657,191 | 4/1987 | Dwyer et al. | 241/282 X |
| 4,846,411 | 7/1989 | Herron et al. | 241/186.4 X |
| 5,033,683 | 7/1991 | Taylor | 241/605 X |
| 5,090,630 | 2/1992 | Kopecky et al. | 241/279 |

FOREIGN PATENT DOCUMENTS

| | | | |
|---|---|---|---|
| 1177366 | 11/1984 | Canada . | |
| 1186598 | 5/1985 | Canada . | |
| 2020146 | 1/1991 | Canada . | |
| 1289041 | 8/1991 | Canada . | |
| 1294855 | 1/1992 | Canada . | |
| 1313992 | 3/1993 | Canada . | |
| 2142116 | 2/1994 | Canada . | |
| 2086569 | 1/1995 | Canada . | |
| 2149475 | 3/1997 | Canada . | |
| 1704694 | 1/1992 | U.S.S.R. | 241/605 X |

*Primary Examiner*—John M. Husar

*Attorney, Agent, or Firm*—Ian Fincham; McFadden, Fincham

[57] ABSTRACT

A bale separator for use in separating bales of crop materials. The bale is separated by the action of a rotatable member which engages the bale. The rotatable member includes a central shaft and a number of spaced apart fingers which extend out from the shaft to engage the bale during rotation of the shaft. The separator acts substantially without chopping the bale materials and can be used to separate and spread the bale materials in one operation. The separator can be mounted on a trailer for towing.

13 Claims, 3 Drawing Sheets

BALE SEPARATOR

This application is a continuation of application Ser. No. 08/588,819, filed Jan. 19, 1996 now abandoned.

FIELD OF THE INVENTION

This invention relates to an apparatus for separating bales of crop materials.

BACKGROUND OF THE INVENTION

Crop materials, such as hay and silage are commonly stored in bales of various forms held together by twine. The most common forms are termed circular bales and square bales.

When the bale materials are required, the bale must be separated. Bale separation has been done by cutting the twine and manually breaking apart the bale. Machines, such as tractors, have been used to move the bale around to break it apart once the twine is cut. It would be desirable to have a machine for automatically separating bale materials. It would further be desirable if such a machine could be used to separate and spread such materials in one operation. Such a machine would facilitate spreading bedding materials and filling feed bins.

Bale processors are known which disintegrate bales of crop material. However, such processors are primarily intended for use with circular bales. Further, bale processors act to chop the crop material while breaking apart the bale. The resultant chopped materials are not useful for all applications.

Examples of known arrangements in the bale processing art include U.S. Pat. No. 4,227,654, issued to Seefeld et al., Oct. 14, 1980; U.S. Pat. No. 4,573,846, issued Mar. 4, 1986 to Willbanks et al. and U.S. Pat. No. 4,846,411, issued to Herron et al., Jul. 11, 1989.

It would be desirable to have a bale separator which is capable of separating the bale material without chopping the material.

SUMMARY OF THE INVENTION

One object of the present invention is to provide an improved bale separator.

Another object of the present invention is to provide an apparatus for separating a bale of crop materials, the apparatus comprising:

- a deck for supporting at least one bale;
- an elongate rotatable member having a central shaft at an end of said deck;
- finger means pivotally connected to said rotatable member for separating said bale, wherein said bale is confined between said deck and said rotatable member for acting on said bale and for discharging separated materials; and
- means to slidingly advance said bale continuously on said deck to said rotatable member to selectively engage said fingers of said rotatable member against said bale during downward rotational movement.

A further object of the present invention is to provide a portable apparatus for separating a bale of crop materials, the apparatus comprising:

- a movable support member;
- a bale loading means for loading a bale into said apparatus;
- a bale separating mechanism including:

- a substantially planar deck for supporting at least one bale;
- an elongate rotatable member having a central shaft substantially parallel to said deck at an end of said deck;
- drive means for driving said rotatable member;
- finger means pivotally mounted on said rotatable member for separating said bale, wherein said bale is confined between said deck and said rotatable member for acting on said bale and for discharging separated material; and
- movable barrier means for continuously advancing a bale slidingly on said deck into contact with said finger means.

The inventive separator is particularly suitable for separating bales having square configuration. The separator acts substantially without chopping the crop material. The separator can be used to separate and spread the crop materials in one operation.

The separating action of the apparatus is effected by a rotatable member having a central elongate shaft and plurality of spaced apart fingers extending therefrom. The rotatable member is preferably of a length to correspond to or exceed the width of a bale to be separated. The fingers extend from the shaft and engage the bale to be separated during rotation of the rotatable member. The rotatable member is positioned relative to the support means such that the rotatable member does not act to shear the separated bale materials against the support means or any other object. The rotatable member can be driven to rotate by any suitable means.

The central shaft of the rotatable member can be formed of any suitable material. In one embodiment, the shaft is formed having a tubular member onto which the fingers are mounted and a stub rod, having a reduced diameter from that of the tubular member, extending from each end of the tubular member in concentric relation thereto and in drivable engagement therewith.

The fingers are made from any suitable material, such as, for example, durable polymers or steel. The fingers are formed and mounted on the shaft such that they do not effect a cutting action when coming into contact with the bale material. Preferably, the fingers are elongate in cross section and mounted on the rotatable member parallel to the long axis of the rotatable member such that a flat surface is first brought into contact with the bale materials.

To facilitate the use of the rotatable member on bales which are not easily separated, for example, those comprised of fragile crop materials or those having high moisture content, pivotal connections can be provided between the fingers and the shaft. Such connection provides that the fingers are free to pivot about the shaft to extend out from the shaft during rotation thereof and to flex when encountering a force opposite to the rotational force. Pivotal connection of the fingers further allows the separator to operate at lower power consumption and substantially avoids stalling of the separator. The pivotally connected fingers are further preferably concave along the long axis to perform a scooping action when coming into engagement with the bale.

The fingers are spaced apart along the shaft of the rotatable member in any suitable way. In one embodiment, the fingers are spaced along the entire surface of the shaft. In another embodiment, the fingers are arranged in a single spiral arrangement running from one end of the shaft to the other. Such an arrangement decreases the power requirements for the separator. To facilitate the separation of bale materials which are not easily separable, such as a frozen bale, the fingers are arranged in a single spiral arrangement and are spaced apart such that the active surface area of the fingers overlap.

The bale separator comprises means for supporting the bale to be separated. The means for supporting the bale can be, for example, a frame or deck. Preferably the support means is a deck mounted onto a trailer type undercarriage for towing behind a tractor or the like such that the separator can be used while in tow and can be moved from location to location.

To bring the bale into contact with the fingers a means is provided for relative movement between the bale to be separated and the rotatable member. Such means can be, for example, a conveyor system or a barrier movable to push the bale towards the rotatable member. Alternatively, the bale can remain stationary and the rotatable member can be advanced into engagement with the bale. The means for relative movement is preferably a push frame which acts as a barrier and advances the bale toward the rotatable member, while the rotatable member is fixed in its position.

To separate a bale of crop materials, the bale is placed on the support means. The rotatable member is rotated while the means for providing relative movement between the bale and the rotatable member is actuated to engage the fingers of the rotatable member against the bale. The rotatable member is preferably rotated such that the fingers engage the bale during downward rotation such that the bale is drawn against the support means and into the rotatable member. The operation of the separator in this way causes the separated bale materials to be forced in a generally downward and horizontal direction. Where no shield is provided against such movement, the force imparted by the fingers will act to spread the separated materials in this direction.

Where desired, a bale loading mechanism can be mounted in relation to the support means to facilitate the loading of bales to the support means. In one embodiment, a hydraulically actuated pivotally connected lift is provided which is movable between a position in which it is lowered to accept a bale and a position in which it is raised. In the raised position, the lift is positioned such that the bale will descend onto the support means by gravity. In another embodiment, the lift is maintainable in a partially raised position such that a bale can be stored on the lift prior to placement on the support means.

Shields can be provided which cover moving parts if desired. The bale separator may be used in various ways for use in separating bales. The separator can be used in a stationary manner or, alternatively, can be mounted on a trailer for use in separating and spreading a bale while in tow or for transport from location to location for use at a fixed point. Such operational examples are for illustration only and are not intended to limit the invention in any way.

A further, detailed, description of the invention, briefly described above, will follow by reference to the following drawings of specific embodiment of the invention, which depict only typical embodiments of the invention and are therefore not to be considered limiting of its scope.

BRIEF DESCRIPTION OF THE DRAWINGS

Similar numerals in the Figures denote similar elements.

DETAILED DESCRIPTION OF THE PREFERRED EMBODIMENTS

Figure 1:
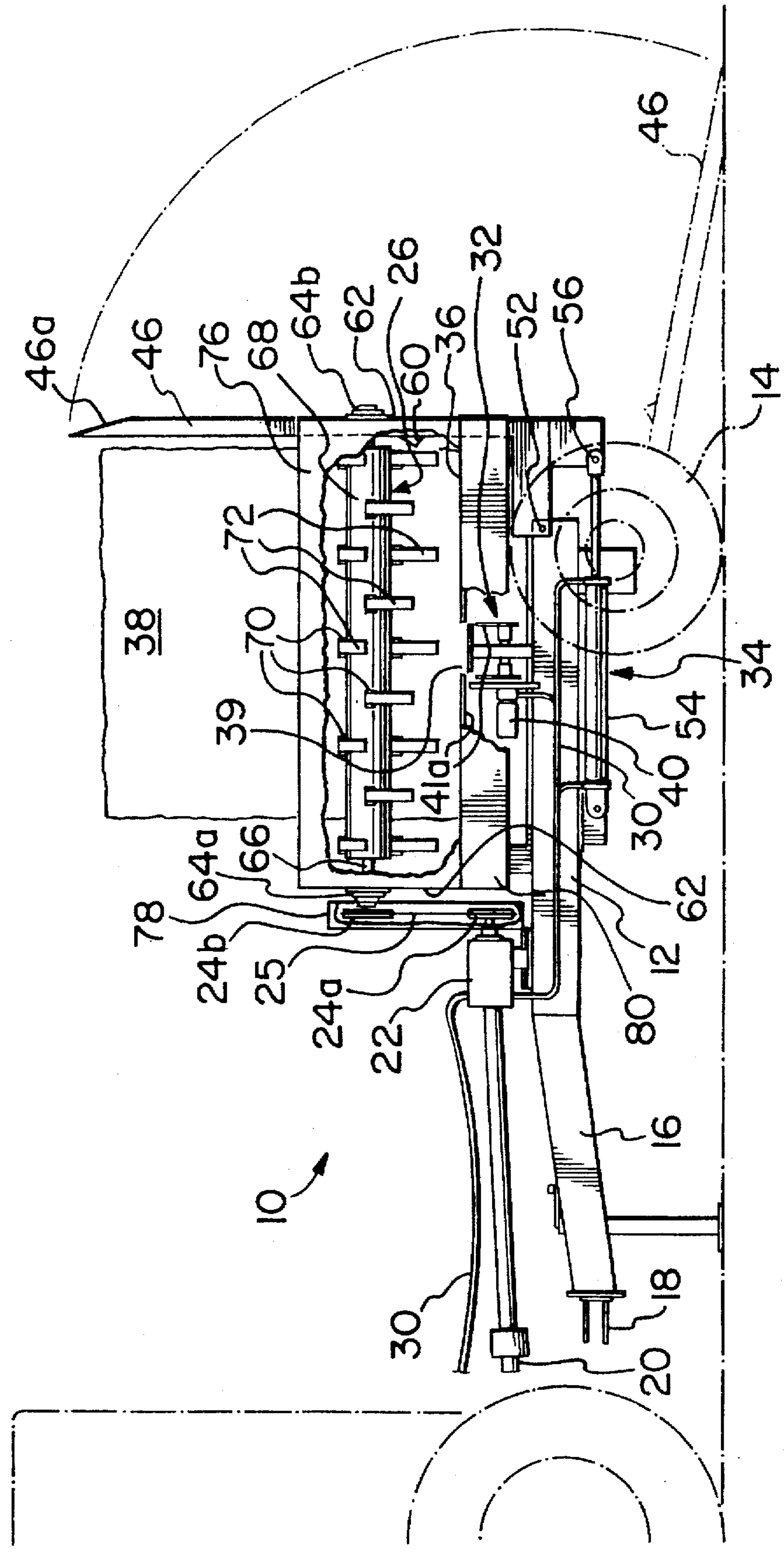
FIG. 1 is a side elevational view of a bale separator according to one embodiment of the present invention with shields partially cut away.

Referring to FIG. 1, an embodiment of a bale separator 10 is shown. The separator 10 includes a trailer undercarriage 12 supported on a pair of wheels 14 (only one shown). Undercarriage 12 includes a tongue 16 and hitch 18 for attachment to a vehicle such as a tractor, shown in phantom to provide for a portable apparatus.

A drive shaft 20 extends for connection to a source of rotary power such as a power take-off of a vehicle. A housing 22 contains coupling elements for translating the operative power from drive shaft 20 to a system of gear pulleys **24*a*, 24*b* and a belt 25 which drive a rotatable member 26**.

Hydraulic hoses 30 supply operating fluid power from a hydraulic source, such as a vehicle, for operating a mechanism 32 for advancing bales and a mechanism 34 for loading bales.

A deck 36 is mounted above undercarriage 12 and is constructed to support at least one bale 38 of crop materials. The number of bales which can be supported by the deck is determined by the size of the bales to be separated and the area of the deck. The deck should have an area to accommodate at least one large square bale which is approximately 8 feet in length.

Mechanism 34 drives a pair of forks 46 between a lowered position, as indicated in phantom, for accepting a bale and a raised position from which the bale drops by gravity onto deck 36. To facilitate loading of a bale, forks 46 are chamfered at their ends **46*a*. Forks 46 are together pivotally connected to undercarriage 12 at 52 and to a hydraulic cylinder 54 of mechanism 34 at 56**.

Figure 2:
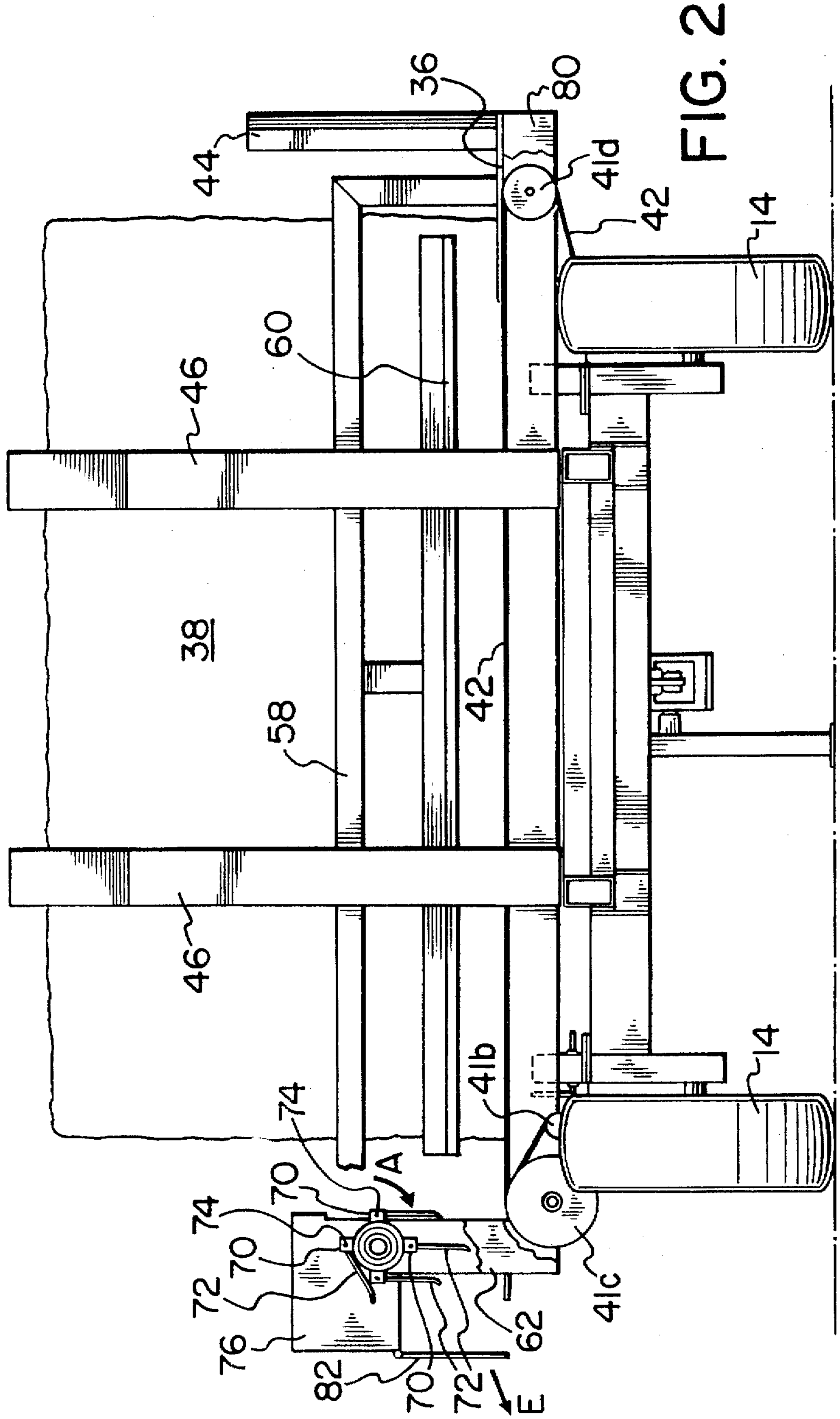
FIG. 2 is an end view of a bale separator according to the present invention with shields partially cut away.

As best seen in FIG. 2, cross members 58, 60 extend between forks 46. Cross member 60 is formed to extend out from the forks and acts as a guide for the bale. Member 60 guides the bale into alignment with rotatable member 26 when the bale is dropped onto deck 36. Member 60 further guides and stabilizes the bale during operation of the separator. Mechanism 34 can maintain forks 46 in a partially raised position to permit the storage of an extra bale which can be descended onto the deck when desired.

Mechanism 32 is mounted beneath deck 36 to drive barrier 44. An opening 39 is provided in deck 36 to allow a portion of barrier 44 to extend beneath the deck for connection to mechanism 32. Opening 39 is elongate and formed to guide barrier 44 between a bale accepting position, as shown in FIG. 2 and a position (not shown) adjacent rotatable member 26 as it is driven by mechanism 32. In the preferred embodiment, mechanism 32 includes a hydraulic motor 40 in communication with sprockets **41*a* and 41*b* which translate rotational energy to a sprocket 41*c*. Sprocket 41*c* drives a chain 42 about a sprocket 41*d*. Chain 42 is rigidly connected to barrier 44 to move barrier 44 along opening 39 as chain 42 is driven by sprocket 41*c***.

Rotatable member 26 is securely mounted above and at a side of deck 36 by means of support walls 62. Rotatable member is formed as a central shaft having a pair of stub rods 66, formed of cold rolled steel, engaged at each end of a hollow tubular member 68, formed of steel. Rods 66 are engaged in bearings 64. A plurality of clevises 70 are secured, as by welding, to tubular member 68 for attachment of fingers 72 by pins 74. Fingers 72 are mounted on member 68 through clevises 70 such that the planes defined by the sides of the fingers 72 are parallel to the central axis of rotatable member 26 which is generally defined by rods 66. Fingers 72 are preferably made of spring steel and may be formed to each define a hook at each free end.

Shields, such as rotatable member shield 76 and rotatable member drive shield 78 are placed to cover moving parts. Skirts 80 extend downwardly from deck 26 to shield mechanism 32. A deflection shield 82 is pivotally connected at a lower edge of rotatable member shield 76 to cause ejected bale materials to be deflected downwardly.

In operation, drive shaft 20 and hoses 30 are connected to a source of power such as a tractor; if desired, hitch may be connected to a vehicle. Barrier 44 is moved into position for accepting a bale. Forks 46 are lowered to accept a bale of crop materials and mechanism 34 is then actuated to raise forks 46 until the bale drops by gravity onto deck 36. If desired, forks 46 are again lowered to accept a further bale. Forks 46 are then raised partially by mechanism 34 such that the bale is retained on the forks.

Figure 3:
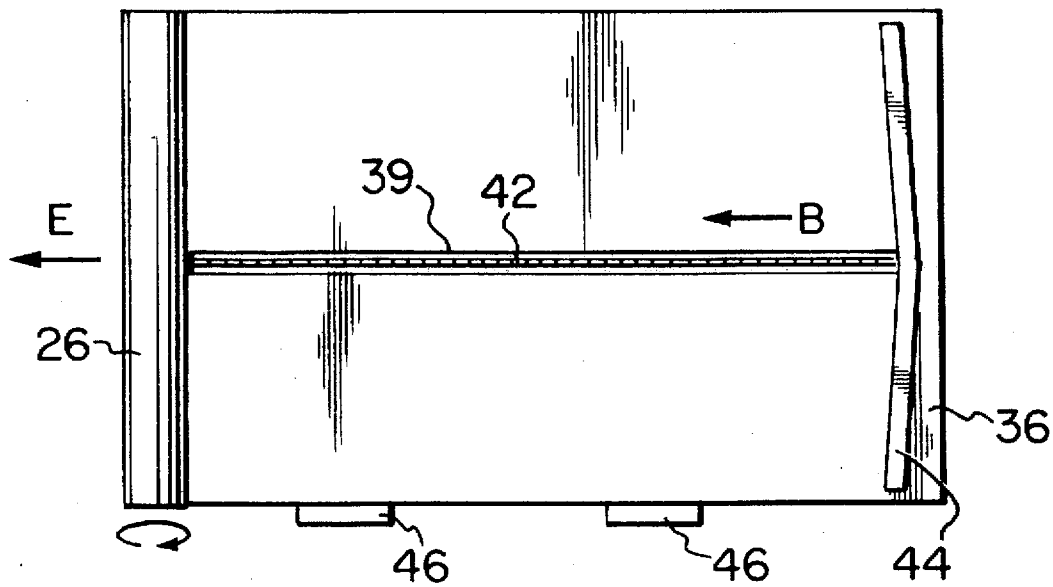
FIG. 3 is a schematic plan view of a bale separator according to the present invention.

Referring to FIGS. 2 and 3, rotatable member 26 is actuatable to rotate at a high speed, for example 800 revolutions per minute (RPM) or greater and more desirably 1,000 RPM in the direction indicated by arrow A, such that fingers 72 are forced to pivot about pins 74 to extend out, substantially at right angles from tubular member 68. Mechanism 32 is actuated to drive barrier 44 towards rotatable member 26, as indicated by arrow B, and thereby move the bale into engagement with fingers 72.

The speed at which the bale is introduced into contact with rotatable member 26 will vary with the type of material of which the bale is made. Once in engagement with the bale, fingers 72 scoop materials from the bale. Such separated materials are carried by fingers 72 to be ejected in the direction E away form rotatable member 26. Deflection shield 82 acts to deflect separated materials in a downward direction. The force imparted to the separated materials causes these materials to travel a distance from the separator when deflection shield 82 is not in position. Thus, deflection shield 82 can be removed to permit the spreading of the separated materials.

Figure 4:
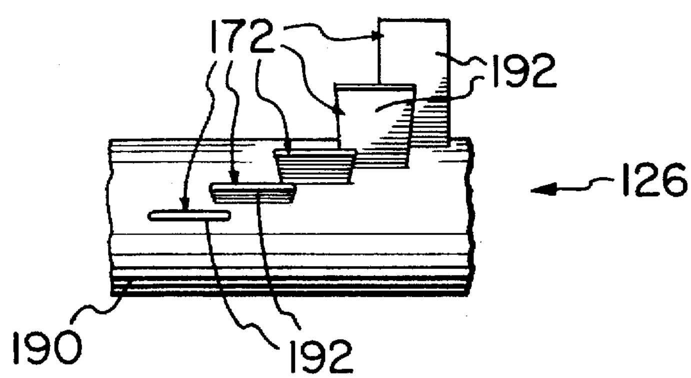
FIG. 4 is a side elevational view of a portion of a rotatable member useful in the present invention.

Referring to FIG. 4, a portion of a rotatable member 126 useful in the present invention is shown. Member 126 includes a shaft 190 having a plurality of fingers 172 extending out therefrom. Fingers 172 are arranged about shaft 190 in a spiral configuration such that the flat faces 192 of the fingers overlap. Such a rotatable member is useful for separating bales which are not easily separable, such as frozen bales.

The fingers may comprise of paddles or any other suitable form which does not chop the material of which the bale is made, but rather merely separates it without chopping.

It will be apparent that many other changes may be made to the illustrative embodiments, while falling within the scope of the invention and it is intended that all such changes be covered by the claims appended hereto.

I claim:

1. An apparatus for separating a bale of crop materials, said apparatus comprising:

a deck for supporting at least one bale;

an elongate rotatable member having a central shaft at an end of said deck;

finger means pivotally connected to said rotatable member for separating said bale, wherein said bale is confined between said deck and said rotatable member for acting on said bale and for discharging separated materials; and means to slidingly advance said bale continuously on said deck to said rotatable member to selectively engage said fingers of said rotatable member against said bale during downward rotational movement.

2. The apparatus as defined in claim 1, wherein said central shaft defines the long axis of said rotatable member and said finger means are elongate in cross section and mounted on the shaft such that they extend in parallel to the axis of the rotatable member.

3. The apparatus as defined in claim 1, wherein said finger means are arranged in a spaced and spiral configuration about the shaft.

4. The apparatus as defined in claim 1, wherein said finger means include a hook at their free ends.

5. The apparatus as defined in claim 1, wherein said means to slidingly advance said bale on said deck comprises a movable barrier member for pushing said bale along said deck for engagement with said finger means.

6. The apparatus as defined in claim 1, wherein said deck for supporting at least one bale is mounted onto a trailer undercarriage.

7. The apparatus as defined in claim 1, further including a bale loading means mounted in relation to said support means.

8. The apparatus as defined in claim 7, wherein said bale loading means comprises a pair of forks movable between a lower position, for accepting a bale, and a raised position, in which said bale descends under gravity onto said support means.

9. The apparatus as defined in claim 1, wherein said bale loading means is maintainable in a partially raised position to provide storage for an additional bale.

10. A portable apparatus for separating a bale of crop materials, said apparatus comprising:

a movable support member;

a bale loading means for loading a bale into said apparatus;

a bale separating mechanism including:

a substantially planar deck for supporting at least one bale;

an elongate rotatable member having a central shaft substantially parallel to said deck at an end of said deck;

drive means for driving said rotatable member;

finger means pivotally mounted on said rotatable member for separating said bale, wherein said bale is confined between said deck and said rotatable member for acting on said bale and for discharging separated material; and movable barrier means for continuously advancing a bale slidingly on said deck into contact with said finger means.

11. The apparatus as defined in claim 10, wherein said drive means includes means for connection with a power take off.

12. The apparatus as defined in claim 11, wherein said movable support comprises a trailer.

13. The apparatus as defined in claim 12, wherein said movable barrier means is operative for controlling the speed at which a bale is introduced into contact with said finger means.

* * * * *